United States Patent

[11] 3,630,351

| [72] | Inventor | Richard W. Uhinck<br>Columbia Station, Ohio |
|---|---|---|
| [21] | Appl. No. | 804,023 |
| [22] | Filed | Mar. 3, 1969 |
| [45] | Patented | Dec. 28, 1971 |
| [73] | Assignee | Gibbsite Corporation of America<br>Rochester, N.Y. |

[54] METHODS OF UPGRADING ALUMINA-BEARING MATERIALS
22 Claims, No Drawings

[52] U.S. Cl............................................................ 209/5
[51] Int. Cl............................................................ B03b 1/04
[50] Field of Search............................................ 209/3, 5, 9, 2, 4, 12; 23/293, 312; 75/2

[56] References Cited
UNITED STATES PATENTS
3,509,066  4/1970  Jacobs et al. ................. 209/5 X FOREIGN PATENTS
563,045  7/1944  Great Britain................. 209/5

*Primary Examiner*—Frank W. Lutter
*Assistant Examiner*—Ralph J. Hill
*Attorney*—Watts, Hoffmann, Fisher & Heinke ABSTRACT: A continuous method of separating associated gibbsite ($Al_2O_3 \cdot 3H_2O$) from the siliceous material contained in gibbsite-bearing sands and alumina-bearing ores characterized by a reagent to a slurry of the raw material for the purpose of promoting separation and settling of slurrying the sand or ore with water and a reagent in an amount sufficient to cause separation of the siliceous material from the alumina and to permit settling of heavy siliceous material from the slurry. The reagent is selected from the group consisting of sodium hypochlorite, sodium pyrophosphate and ammonium hydroxide, and trisodium phosphate, wherein sodium hypochlorite is preferred.

3,630,351

METHODS OF UPGRADING ALUMINA-BEARING MATERIALS

BACKGROUND OF THE INVENTION

This invention relates generally to methods of upgrading alumina-bearing sands, and more specifically to methods for separating gibbsite ($Al_2O_3 \cdot 3H_2O$) from the siliceous material contained in gibbsite-bearing sands.

The basic aluminum industry typically involves two operations. In the first operation raw bauxite is converted to high-purity alumina, usually by the Bayer process, and in the second operation the high-purity alumina is reduced to aluminum metal by the Hall process. The Bayer process generally consists of digesting bauxite with caustic soda solution to dissolve the alumina and separate it from impurities in the ore. The dissolved alumina is then precipitated from solution, filtered, dried and finally calcined to obtain the pure alumina for use as pot feed material.

The first operation should be carried out so that the silica content of the alumina-bearing material is reduced to less than 10 percent, and preferably to 5 percent or less, prior to calcination. Materials having larger amounts of silica can result in serious operational problems, for example, fouling of the drums used in the calcinating step. Heretofore, alumina-bearing sands, particularly gibbsite-bearing sands, have not been used commercially as a raw material because of the large amounts of contained silica and the inability to economically reduce the silica content to an acceptable level prior to calcination.

SUMMARY OF THE INVENTION

The present invention provides a practical and economical method for upgrading alumina-bearing sands prior to calcination in the production of high-purity, pot feed alumina. More particularly, the invention provides an efficient method for physically separating gibbsite from the siliceous material contained in gibbsite-bearing sands.

In accordance with this invention, the separation is accomplished by slurrying the sand with water and a reagent, and allowing the heavier silica to settle out. The thin slurry containing a suspension of the lighter gibbsite together with the fine but heavier siliceous material is then introduced into a low-gravity centrifugal separator where the heavier siliceous material is separated from the gibbsite suspension. The gibbsite is recovered from the suspension by use of a high-gravity centrifugal separator.

The preferred reagent used in the process of this invention is sodium hypochlorite (NaOCl). The sodium hypochlorite is normally added to the water prior to mixing with the sand to give a concentration of from 0.003 to 6 percent by weight, with the optimum concentration being from 0.012 to 0.014 percent by weight, and more preferably 0.012 percent by weight. In alternative embodiments of the invention, the reagent may be either trisodium phosphate having a concentration in the water of from 0.003 to 6 percent by weight with the preferred concentration being 0.015 percent by weight or sodium pyrophosphate at a concentration of from 0.003 to 0.1 percent by weight in the water and ammonium hydroxide having a concentration in the water of from 0.003 to 6 percent by weight. The optimum concentrations of the sodium pyrophosphate and ammonium hydroxide are respectively 0.008 and 0.02 percent by weight.

The process of the present invention yields a product containing 92 percent or more alumina, 5 percent or less silica (dry basis) and 3 percent free water. If desired, the free water can be removed prior to shipment by passing the product through a drier operating at a temperature which does not exceed 280° F. Following calcination, the purified alumina may be introduced as pot feed material in the Hall process.

Other advantages and a fuller understanding of the invention will be had from the following detailed description.

DESCRIPTION OF THE PREFERRED EMBODIMENTS

The invention is hereinafter specifically described in connection with the treatment of gibbsite ($Al_2O_3 \cdot 3H_2O$)-bearing sands to obtain a low-silica-containing product which is capable of being calcined to produce a high-purity, pot feed grade alumina. It is to be understood, however, that the described processes also can be used to upgrade other forms of alumina-bearing sands and ores prior to calcination.

In carrying out the processes of the invention, the raw material may be first passed through a hammermill to break up agglomerates of the sand gibbsite mixture. Organic trash, pebbles, mud balls and the like are removed from the pulverized mixture by passing it through a 2 to 20 mesh screen.

The screen undersize is mixed with water containing an aqueous solution of the desired reagent to form a slurry. The amount of water which is used to prepare the slurry is not critical and may vary widely without adverse affects on the separation of the silica from the alumina. A slurry containing approximately 15 to 20 percent by weight solids is frequently used in carrying out the invention.

In the preferred procedure for separating the silica, a dilute aqueous solution of sodium hypochlorite (NaOCl) is added to water prior to mixing with the sand. The concentration of the sodium hypochlorite in the water may range from 0.003 to 6 percent by weight. A concentration of sodium hypochlorite in excess of about 6 percent has the adverse effect of causing excess alumina to go into solution, while a concentration less than about 0.003 percent has been found to have little effect in promoting separation of the silica from the alumina. The most efficient separation of the silica has resulted when the reagent is added to the water to give a sodium hypochlorite concentration in the range of from 0.012–0.014 percent by weight, with the optimum concentration being 0.012 percent by weight. The reagent is normally introduced in the water as a 5 percent solution os sodium hypochlorite.

The slurry containing the screen undersize and the sodium hypochlorite reagent is agitated and then allowed to settle. Additional sodium hypochlorite solution may be added just prior to or during agitation to maintain the desired concentration of the reagent in the slurry. The siliceous material in the form of sand which is essentially free of gibbsite constitutes the heavier lower portion of the settled solids and may be removed from the settling tank. The remaining suspended matter may be decanted or siphoned off as a thin slurry having a solids content which is predominantly gibbsite and 12 percent or less silica. The thin slurry is then passed through a low-gravity centrifugal separator to further reduce the silica content and yield a product containing 5 percent or less silica on a dry basis. The gibbsite is recovered from suspension by use of a high-gravity centrifugal separator. The remaining liquor may be treated with additional sodium hypochlorite and used over again.

In another embodiment of the invention, the slurried raw material may be treated with a dilute aqueous solution of ammonium hydroxide and sodium pyrophosphate. The reagent is added to the water prior to mixing with the screen undersize to produce a sodium pyrophosphate concentration in the range of from 0.003 to 0.1 percent and an ammonium hydroxide concentration in the range of from 0.003 to 6 percent by weight. The optimum concentration of the ammonium hydroxide in the water has been found to be approximately 0.02 percent, and the optimum concentration of the sodium pyrophosphate is approximately 0.008 percent by weight. The slurry treated with the reagent is allowed to settle and the gibbsite suspension is centrifuged as described above to yield a product having a low amount of contained silica in the range of from about 4 to 5 percent.

In still another embodiment of the invention, the separation and settling of the silica is promoted by the use of trisodium phosphate as the reagent. A dilute aqueous solution of trisodium phosphate is added to water to produce a concentration of from 0.003 to 6 percent with the optimum concentration being about 0.015 percent. The alumina-bearing sand is slurried in the water containing the trisodium phosphate, and the slurry agitated and allowed to settle. The suspension is centrifuged in first a low-gravity separator and then a high-gravity separator as described above to obtain an upgraded product containing 6 percent or less silica.

The recovery of the upgraded alumina may be facilitated by the addition of a flocculating agent which makes the alumina particles easier to separate by centrifugal force in the final stage of the process. A preferred flocculating agent is an amine acetate salt, such as that sold under the trademark Armac-C by Armor Industrial Chemical Co. The amine acetate salt may be added to the water separate from the reagent prior to mixing with the sand or ore to a concentration of from 0.001 to 0.1 percent by weight, with the preferred concentration being about 0.004 percent.

It has been found that the use of a flocculating agent has a mildly adverse effect on the separation of the silica. For example, the product obtained using sodium hypochlorite reagent and an amine acetate salt has a silica content of from about 4 to 6 percent while the product obtained using trisodium phosphate reagent and an amine acetate salt may have a silica content of from about 5 to 8 percent. Therefore, it is to be understood that the use of a flocculating agent is optional and is not limiting of the invention.

The upgraded alumina product obtained by the process of this invention may be passed through a drier operating at a maximum temperature of 280° F. to remove the free water. If the product is shipped without dewatering, the free water may be removed by drying and calcining at the plant site prior to use as pot feed alumina.

A unique feature of the foregoing process is the initial treatment of the slurry with a reagent, preferably sodium hypochlorite, to promote separation and settling of the siliceous material. The exact mechanism by which the siliceous material is separated from the alumina is not completely understood, but it is believed to result from the vigorous oxidizing effect of the reagent. It is generally recognized that gibbsite is formed by both weathering and bacteriological action, and it is likely that the individual particles of gibbsite are coated or associated with some organic matter which normally interferes with the separation of the gibbsite from the silica. The oxidizing action of the reagent may disperse the interfering organic material to promote separation of the gibbsite from the silica in the slurry. The upgrading of alumina-bearing sand is much less effective in the absence of the oxidizing reagent, and a simple water slurry will normally yield a product containing from 9 to 14 percent or more silica which is impractical to calcine. It is to be understood that the invention is not limited to the described mechanism and that it has been set forth only as one possible explanation for the effective results which are obtained through use of the reagents in accordance with the preferred embodiments.

The following is an example of the invention in which sodium hypochlorite was used in the treatment of a gibbsite-bearing sand containing approximately 20 percent gibbsite and 80 percent silica. After passing the raw material through a hammermill and screening out the organic trash, pebbles and mud balls, the raw material was mixed with water to form a slurry having approximately 20 percent by weight solids. A 5 percent solution of sodium hypochlorite was added to the water prior to slurrying to produce a sodium hypochlorite concentration of approximately 0.012 to 0.014 percent by weight. The treated slurry was agitated thoroughly and allowed to settle. After decanting the suspended matter as a thin slurry, the silica content of the solids was found to be approximately 12 percent. This thin slurry was then passed through a low-gravity centrifugal separator to remove additional amounts of the heavier silica and the gibbsite was recovered using a high-gravity centrifuge. The resulting product contained about 4 percent silica.

The above-described example of the invention was duplicated with the addition of an amine acetate salt, identified as Armac-C, to serve as a flocculating agent. The concentration of the salt in the water was approximately 0.004 percent by weight. The product obtained contained about 5 percent silica.

In the following example of the invention, ammonium hydroxide and sodium pyrophosphate were substituted for sodium hypochlorite in treating a water base slurry of the same gibbsite-bearing sand employed in the previously described examples. The concentration of the sodium pyrophosphate in the water was maintained at approximately 0.008 percent by weight and the concentration of ammonium hydroxide at 0.02 percent by weight. The treated slurry was allowed to settle and was then passed through a centrifugal separator and a high-gravity centrifuge as in the previous example. The resulting product contained approximately 5 percent silica.

In another example of the invention, the reagent which was used was trisodium phosphate having a concentration in the water of approximately 0.015 percent by weight. The slurry of the same gibbsite-bearing sands used in the previous examples was agitated and allowed to settle. The suspension was passed through a low gravity separator and a high-gravity separator to obtain a product containing approximately 5 percent silica.

The previously described embodiment using trisodium phosphate reagent was duplicated with the addition of an amine acetate salt, identified as Armac-C, having a water concentration of 0.004 percent by weight. The resulting product contained approximately 7 percent silica.

Many modifications and variations of the invention will be apparent in the light of the foregoing detailed disclosure. Therefore, it is to be understood that, within the scope of the appended claims, the invention can be practiced otherwise than as specifically described.

What is claimed is:

1. In a process of separating alumina from the siliceous material contained in alumina-bearing sand, the steps comprising slurrying the sand with water and sodium hypochlorite an amount sufficient to cause separation of the siliceous material from the alumina and to permit settling of heavy siliceous material, and settling and separating said heavy siliceous material from the slurry.

2. A process according to claim 1 in which the sodium hypochlorite concentration in the water phase of the slurry is in the range of from 0.003 to 6 percent by weight.

3. A process according to claim 1 in which the sodium hypochlorite concentration in the water phase of the slurry is from 0.012 to 0.014 percent by weight.

4. A process of separating alumina from the siliceous material contained in alumina-bearing sand comprising the steps of slurrying the sand with water and sodium hypochlorite in an amount sufficient to cause separation of the siliceous material from the alumina and to permit settling of heavy siliceous material, settling and separating said heavy siliceous material from the slurry to obtain a suspension of alumina and lighter siliceous material, and centrifuging said suspension to reduce the siliceous material content of said suspension.

5. A process according to claim 4 in which the sodium hypochlorite concentration in the water phase of the slurry is in the range of from 0.003 to 6 percent by weight.

6. A process according to claim 4 in which the sodium hypochlorite concentration in the water phase of the slurry is from 0.012 to 0.014 percent by weight.

7. In a process of separating gibbsite from the silica contained in gibbsite-bearing sand, the steps comprising slurrying the sand with water and an aqueous solution of sodium hypochlorite having a concentration of from 0.003 to 6 percent by weight in the water phase of the slurry to cause separation of the silica from the gibbsite and to permit settling of heavy silica values, and settling and separating said heavy silica values from the slurry.

8. A process of separating gibbsite from the silica contained in gibbsite-bearing sand comprising the steps of slurrying the sand with water and an aqueous solution of sodium hypochlorite having a concentration of from 0.003 to 6 percent by weight in the water phase of the slurry, settling and separating heavy silica values from the slurry to obtain a suspension of gibbsite and lighter silica values, and centrifuging said suspension to reduce the silica content of said suspension.

9. A process according to claim 8 wherein the concentration of the sodium hypochlorite in the water phase of the slurry is from 0.012 to 0.014 percent by weight.

10. In a process of separating alumina from the siliceous material contained in alumina-bearing sand, the steps comprising slurrying the sand with water and a reagent consisting essentially of sodium pyrophosphate and ammonium hydroxide to cause separation of the siliceous material from the alumina and to cause settling of heavy siliceous material from the slurry, the concentration of the sodium pyrophosphate in the water phase of the slurry being in the range of from 0.003 to 0.10 percent by weight and the concentration of the ammonium hydroxide in the water phase of the slurry being in the range of from 0.003 to 6 percent by weight, and settling and separating said heavy siliceous material from the slurry to obtain a suspension of alumina and lighter siliceous material.

11. The process according to claim 10 in which the ammonium hydroxide concentration is approximately 0.02 percent by weight in the water phase of the slurry.

12. A process according to claim 10 in which the sodium pyrophosphate concentration is approximately 0.008 percent by weight in the water phase of the slurry.

13. A process according to claim 10 including the step of centrifuging said suspension to reduce the siliceous material content of said suspension.

14. In a process of separating alumina from the siliceous material contained in alumina-bearing sand comprising the steps of slurrying the sand with water and trisodium phosphate, the concentration of the trisodium phosphate in the water phase of the slurry being in the range of from 0.003 to 6 percent by weight, and settling and separating heavy siliceous material from the slurry to obtain a suspension of alumina and lighter siliceous material.

15. A process according to claim 14 in which the trisodium phosphate concentration is approximately 0.015 percent by weight in the water phase of the slurry.

16. A process according to claim 14 including the step of centrifuging said suspension to reduce the siliceous material content of said suspension.

17. In a process of separating gibbsite from the silica contained in gibbsite-bearing sand, the steps comprising slurrying the sand with water and a dilute solution of an oxidizing reagent in an amount sufficient to cause separation of the silica from the alumina and to permit settling of heavy silica values, agitating the slurry, and settling and separating said heavy silica values from the slurry to obtain a suspension of alumina and lighter silica values.

18. A process according to claim 17 including the step of incorporating a flocculating agent in the slurry.

19. A process according to claim 18 wherein the flocculating agent is an amine acetate salt having a concentration in the water phase of the slurry of from 0.001 to 0.1 percent by weight.

20. A process according to claim 17 including the step of centrifuging said suspension to reduce the silica content of said suspension.

21. In a process of separating gibbsite from the silica contained in gibbsite-bearing sand, the steps comprising slurrying the sand with water and a reagent in an amount sufficient to cause separation of the gibbsite from the silica and to permit settling of heavy silica values, said reagent being selected from the group consisting of sodium hypochlorite, sodium pyrophosphate and ammonium hydroxide, and trisodium phosphate, and settling and separating said heavy silica values from the slurry to obtain a suspension of gibbsite and lighter silica values.

22. A process according to claim 21 including the step of centrifuging said suspension to reduce the silica content of said suspension.

* * * * *

UNITED STATES PATENT OFFICE
CERTIFICATE OF CORRECTION

Patent No. 3,630,351  Dated December 28, 1971

Inventor(s) Richard W. Uhinck

It is certified that error appears in the above-identified patent and that said Letters Patent are hereby corrected as shown below:

In the ABSTRACT, lines 4 and 5, delete the following: "a reagent to a slurry of the raw material for the purpose of promoting separation and settling of"

Signed and sealed this 13th day of June 1972.

(SEAL)
Attest:

EDWARD M. FLETCHER, JR.
Attesting Officer

ROBERT GOTTSCHALK
Commissioner of Patents